(12) United States Patent
Kawahara et al.

(10) Patent No.: US 10,619,703 B2
(45) Date of Patent: Apr. 14, 2020

(54) TORQUE FLUCTUATION INHIBITING DEVICE, TORQUE CONVERTER AND POWER TRANSMISSION DEVICE

(71) Applicant: EXEDY Corporation, Neyagawa-shi, Osaka (JP)

(72) Inventors: Yuki Kawahara, Neyagawa (JP); Yusuke Tomita, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 16/121,295

(22) Filed: Sep. 4, 2018

(65) Prior Publication Data
US 2019/0085936 A1 Mar. 21, 2019

(30) Foreign Application Priority Data
Sep. 15, 2017 (JP) ................................. 2017-177644

(51) Int. Cl.
*F16F 15/14* (2006.01)
*F16H 45/02* (2006.01)

(52) U.S. Cl.
CPC ........... *F16F 15/145* (2013.01); *F16H 45/02* (2013.01); *F16F 2230/0064* (2013.01); *F16H 2045/0263* (2013.01)

(58) Field of Classification Search
CPC . F16F 15/145; F16H 45/02; F16H 2045/0263
See application file for complete search history.

(56) References Cited

U.S. PATENT DOCUMENTS

| 2011/0179782 A1* | 7/2011 | Huegel | F16F 15/13128 60/338 |
| 2015/0075320 A1* | 3/2015 | Verhoog | F16F 15/145 74/574.2 |

(Continued)

FOREIGN PATENT DOCUMENTS

| EP | 2933527 A1 * | 10/2015 | ............ F16F 15/145 |
| JP | 29-004358 A | 7/1954 | |

(Continued)

OTHER PUBLICATIONS

Translation EP2933527.*

*Primary Examiner* — Vicky A Johnson

(74) *Attorney, Agent, or Firm* — United IP Counselors, LLC

(57) ABSTRACT

A torque fluctuation inhibiting device includes plural centrifugal elements movable in a radial direction when receiving a centrifugal force generated in rotation of a rotor and a mass body. Each centrifugal element receives a rotational moment of inertia about an axis arranged in parallel to a rotational axis of the rotor when receiving the centrifugal force. When a relative displacement is produced between the rotor and the mass body in a rotational direction due to the centrifugal force acting on each centrifugal element, each cam mechanism converts the centrifugal force into a circumferential force directed to reduce the relative displacement. Support portions are provided on either the rotor or the mass body, and each makes contact with part of each centrifugal element when each centrifugal element receives the rotational moment of inertia. Each support portion supports each centrifugal element such that each centrifugal element is movable in the radial direction.

12 Claims, 10 Drawing Sheets

(56) References Cited

U.S. PATENT DOCUMENTS

| | | | | |
|---|---|---|---|---|
| 2016/0153521 A1* | 6/2016 | Tondellier | ............. | F16F 15/145 74/574.2 |
| 2016/0273613 A1* | 9/2016 | Verhoog | ............... | F16F 15/145 |
| 2016/0333961 A1* | 11/2016 | Dinger | .................. | F16F 15/145 |
| 2018/0163815 A1* | 6/2018 | Tomiyama | .............. | F16F 15/31 |
| 2018/0298979 A1* | 10/2018 | Tomiyama | .............. | F16F 15/31 |
| 2018/0306270 A1* | 10/2018 | Tomiyama | .............. | F16F 15/31 |
| 2018/0306272 A1* | 10/2018 | Tomiyama | .............. | F16F 15/31 |

FOREIGN PATENT DOCUMENTS

| | | |
|---|---|---|
| JP | 2017-053467 A | 3/2017 |
| WO | 2015/173087 A1 | 11/2015 |

\* cited by examiner

TORQUE FLUCTUATION INHIBITING DEVICE, TORQUE CONVERTER AND POWER TRANSMISSION DEVICE

CROSS-REFERENCE TO RELATED APPLICATIONS

This application claims priority to Japanese Patent Application No. 2017-177644 filed on Sep. 15, 2017, the entirety of which is hereby incorporated by reference in its entirety.

BACKGROUND

Technical Field

The present disclosure relates to a torque fluctuation inhibiting device, particularly to a torque fluctuation inhibiting device for inhibiting torque fluctuations in a rotor to which a torque is inputted and that is rotated about a rotational axis. Additionally, the present disclosure relates to a torque converter and a power transmission device, each of which includes the torque fluctuation inhibiting device.

Background Information

For example, a clutch device, including a damper device, and a torque converter are provided between an engine and a transmission in an automobile. For reduction in fuel consumption, the torque converter is provided with a lock-up device that mechanically transmits a torque at a predetermined rotational speed or greater.

Japan Laid-open Patent Application Publication No. 2017-53467 describes a lock-up device including a torque fluctuation inhibiting device. The torque fluctuation inhibiting device described in Japan Laid-open Patent Application Publication No. 2017-53467 includes an inertia ring, a plurality of centrifugal elements and a plurality of cam mechanisms. The inertia ring is rotatable relatively to a hub flange to which a torque is transmitted, and each centrifugal element receives a centrifugal force generated in rotation of the hub flange and the inertia ring. Each cam mechanism includes a cam provided on the surface of each centrifugal element and a cam follower making contact with the cam.

In the device described in Japan Laid-open Patent Application Publication No. 2017-53467, when the hub flange and the inertia ring are displaced in a rotational direction by torque fluctuations, each cam mechanism is actuated in response to the centrifugal force acting on each centrifugal element, and converts the centrifugal force acting on each centrifugal element into a circumferential force directed to reduce the displacement between the hub flange and the inertia ring. Torque fluctuations are inhibited by this circumferential force.

In the torque fluctuation inhibiting device described in Japan Laid-open Patent Application Publication No. 2017-53467, the hub flange is provided with a plurality of recessed portions in the outer peripheral part thereof. The recessed portions are opened radially outward. The centrifugal elements are accommodated in the recessed portions, respectively, while being radially movable therein. In such a configuration, gaps are produced between both circumferential lateral parts of each centrifugal element and sidewalls opposed thereto in each recessed portion. The gaps cannot be eliminated due to the structure of the torque fluctuation inhibiting device.

With the aforementioned gaps between each centrifugal element and each recessed portion, each centrifugal element is tilted or circumferentially moved during actuation of the torque fluctuation inhibiting device. The tilt and movement of each centrifugal element change in accordance with the orientation of a rotation-directional force acting on each centrifugal element. Therefore, hysteresis occurs in a torsional characteristic exerted by the torque fluctuation inhibiting device (a characteristic indicating a relation between an angle at which the hub flange and the inertia ring are rotated relatively to each other and a torque transmitted between the hub flange and the inertia ring). The hysteresis is supposed to deteriorate an effect to inhibit torque fluctuations (i.e., performance to attenuate torque fluctuations).

Additionally, when each centrifugal element is tilted or circumferentially moved, the profile of the cam provided on the surface of each centrifugal element is changed from a profile planned in design phase, whereby a torsional characteristic planned in design phase cannot be obtained. In other words, there is a drawback of instability in torsional characteristic attributed to the aforementioned gaps.

BRIEF SUMMARY

It is an object of the present disclosure to inhibit deterioration in performance to attenuate torque fluctuations and stabilize the performance to attenuate torque fluctuations in a torque fluctuation inhibiting device including centrifugal elements and cam mechanisms.

(1) A torque fluctuation inhibiting device according to the present disclosure is a device that inhibits torque fluctuations in a rotor to which a torque is inputted. The torque fluctuation inhibiting device includes a mass body, a plurality of centrifugal elements, a plurality of cam mechanisms and a plurality of support portions. The mass body is disposed to be rotatable with the rotor and be rotatable relatively to the rotor. Each of the plurality of centrifugal elements is movable in a radial direction when receiving a centrifugal force generated in rotation of the rotor and the mass body. Each of the plurality of centrifugal elements receives a rotational moment of inertia about an axis arranged in parallel to a rotational axis of the rotor when receiving the centrifugal force. When a relative displacement is produced between the rotor and the mass body in a rotational direction due to the centrifugal force acting on each of the plurality of centrifugal elements, each of the plurality of cam mechanisms converts the centrifugal force into a circumferential force directed to reduce the relative displacement. The plurality of support portions are provided on either the rotor or the mass body, and each makes contact with part of each of the plurality of centrifugal elements when each of the plurality of centrifugal elements receives the rotational moment of inertia. Each of the plurality of support portions supports each of the plurality of centrifugal elements such that each of the plurality of centrifugal elements is movable in the radial direction.

When a torque is inputted to the rotor in this device, the rotor and the mass body are rotated. When the torque inputted to the rotor does not fluctuate, a relative displacement is not produced between the rotor and the mass body in the rotational direction. On the other hand, when the torque inputted to the rotor fluctuates, the relative displacement is produced between the mass body and the rotor in the rotational direction (the displacement will be hereinafter expressed as "rotational phase difference" on an as-needed basis) depending on the extent of torque fluctuations, because the mass body is disposed to be rotatable relatively to the rotor.

When the rotor and the mass body are herein rotated, each of the plurality of centrifugal elements receives a centrifugal force. Then, when the relative displacement is produced between the rotor and the mass body in the rotational direction, each of the plurality of cam mechanisms converts the centrifugal force acting on each of the plurality of centrifugal elements into the circumferential force. The circumferential force acts to reduce the relative displacement between the rotor and the mass body. Torque fluctuations are inhibited by the herein described actuation of the cam mechanism.

The centrifugal force acting on each of the plurality of centrifugal elements is herein used as a force for inhibiting torque fluctuations. Hence, a characteristic of inhibiting torque fluctuations varies in accordance with the rotational speed of the rotor. Additionally, the characteristic of inhibiting torque fluctuations can be appropriately set by, for instance, the cam shape or so forth. Hence, a peak of torque fluctuations can be reduced in as wide a rotational speed range as possible.

Moreover, when receiving the centrifugal force, each of the plurality of centrifugal elements receives the rotational moment of inertia about the axis arranged in parallel to the rotational axis of the rotor. Each of the plurality of centrifugal elements is tilted by the rotational moment of inertia, and makes contact in part with each of the plurality of support portions. Therefore, each of the plurality of centrifugal elements can be kept making contact with each of the plurality of support portions by keeping constant the direction of the rotational moment of inertia acting on each of the plurality of centrifugal elements. In other words, each of the plurality of centrifugal elements can be kept in the same posture while being actuated, whereby each of the plurality of cam mechanisms is stabled in characteristic. Therefore, a hysteresis torque can be inhibited from being generated in the torsional characteristic of the plurality of cam mechanisms, whereby the torque fluctuation inhibiting device can avoid deterioration in characteristic to attenuate torque fluctuations. Additionally, the torque fluctuation inhibiting device can obtain a stable characteristic to attenuate torque fluctuations.

(2) Preferably, each of the plurality of cam mechanisms includes a cam and a cam follower. The cam is provided on one of the mass body and each of the plurality of centrifugal elements. The cam follower is provided on the other of the mass body and each of the plurality of centrifugal elements, and is moved along the cam. Additionally, in this case, each of the plurality of centrifugal elements includes a weight portion, and has a center of gravity deviating from a straight line connecting a rotational center of the rotor and a point at which the cam and the cam follower make contact with each other while the relative displacement is not produced between the rotor and the mass body in the rotational direction.

Here, each of the plurality of centrifugal elements includes the weight portion, and has the center of gravity deviating from the center thereof. Because of this, when receiving the centrifugal force, each of the plurality of centrifugal elements receives the rotational moment of inertia. Accordingly, each of the plurality of centrifugal elements is tilted and makes contact in part with each of the plurality of support portions. Therefore, it is possible to eliminate the gap between each of the plurality of centrifugal elements and each of the plurality of support portions. Consequently, as described above, a hysteresis torque can be inhibited from being generated in the torsional characteristic of the plurality of cam mechanisms. Additionally, each of the plurality of centrifugal elements can be prevented from becoming unstable in posture.

(3) Preferably, each of the plurality of centrifugal elements has an asymmetric shape with reference to a straight line connecting the rotational center of the rotor and a point at which the cam and the cam follower make contact with each other while each of the plurality of centrifugal elements receives the centrifugal force and simultaneously the relative displacement is not produced between the rotor and the mass body in the rotational direction.

With the simple configuration, each of the plurality of centrifugal elements can be herein set to have the center of gravity deviating from the center thereof.

(4) Preferably, the plurality of centrifugal elements include a plurality of first centrifugal elements and a plurality of second centrifugal elements. The rotational moment of inertia acts on each of the plurality of first centrifugal elements in a first direction. The plurality of second centrifugal elements are equal in number to the plurality of first centrifugal elements. The rotational moment of inertia acts on each of the plurality of second centrifugal elements in a second direction.

Here, the torsional characteristic of the plurality of cam mechanisms attributed to the plurality of first centrifugal elements and that of the plurality of cam mechanisms attributed to the plurality of second centrifugal elements are combined, and the resultant torsional characteristic can be realized to be as effective as possible. Therefore, the attenuation characteristic to inhibit torque fluctuations is enhanced.

(5) Preferably, the plurality of centrifugal elements include the plurality of first centrifugal elements and the plurality of second centrifugal elements. Each of the plurality of first centrifugal elements has a center of gravity deviating to a first side in the rotational direction. The plurality of second centrifugal elements are equal in number to the plurality of first centrifugal elements, and each has a center of gravity deviating to a second side in the rotational direction.

Similarly to the above, the characteristic to attenuate torque fluctuations can be herein realized to be as effective as possible.

(6) Preferably, the plurality of first centrifugal elements are disposed in pair to be opposed through the rotational center of the rotor, while the plurality of second centrifugal elements are disposed in pair to be opposed through the rotational center of the rotor.

(7) Preferably, each of the plurality of centrifugal elements is moved in a direction slanting with respect to a straight line connecting the rotational center of the rotor and a point at which the cam and the cam follower make contact with each other while the relative displacement is not produced between the rotor and the mass body in the rotational direction.

In the configuration herein described, when each of the plurality of centrifugal elements receives the centrifugal force, one of the lateral parts of each of the plurality of centrifugal elements is configured to be pressed by each of the plurality of support portions, whereby the gap is eliminated between each of the plurality of centrifugal elements and each of the plurality of support portions. Therefore, with this configuration, it is possible to achieve advantageous effects similar to those achieved as described above.

(8) Preferably, the rotor includes a plurality of recessed portions on an outer peripheral surface thereof, and each of the plurality of recessed portions is opened radially outward and accommodates each of the plurality of centrifugal elements. In this case, each of the plurality of centrifugal elements includes a first guide roller rotatably attached to a first circumferentially lateral part thereof and a second guide roller rotatably attached to a second circumferentially lateral part thereof. Additionally, each of the plurality of support portions includes first and second sidewalls of each of the plurality of recessed portions. The first sidewall enables the first guide roller to make contact therewith, whereas the second sidewall enables the second guide roller to make contact therewith.

Here, each of the plurality of centrifugal elements is provided with the first and second guide rollers. The first and second guide rollers are supported by the sidewalls of each of the plurality of recessed portions that compose each of the support portions. Each of the plurality of centrifugal elements is moved in the radial direction.

In the configuration described above, when each of the plurality of centrifugal elements receives the rotational moment of inertia, the first and second guide rollers thereof are pressed onto the sidewalls of each of the plurality of recessed portions of the rotor. Therefore, a gap is not produced between each of the plurality of centrifugal elements and each of the plurality of support portions (the sidewalls of each of the plurality of recessed portions). And similarly to the above, each of the plurality of centrifugal elements can be stabled in posture.

(9) Preferably, each of the first and second guide rollers includes an outer peripheral side rolling element and an inner peripheral side rolling element disposed radially inside the outer peripheral side rolling element.

In this case, each of the plurality of centrifugal elements is guided by totally four rolling elements. Hence, each of the plurality of centrifugal elements can be radially moved in stable posture.

(10) Preferably, the mass body includes a first inertia ring, a second inertia ring and a pin. The first and second inertia rings are disposed in opposition to each other through the rotor. The pin couples the first and second inertia rings to each other while the first and second inertia rings are non-rotatable relatively to each other. Each of the plurality of centrifugal elements is disposed on an outer peripheral part of the rotor and on an inner peripheral side of the pin while being disposed between the first inertia ring and the second inertia ring in an axial direction. The cam follower is a cylindrical roller that includes a hole, penetrated by the pin in the axial direction, in an inner part thereof. The cam is provided on each of the plurality of centrifugal elements so as to make contact with the cam follower, and has a shape making the circumferential force vary in accordance with an amount of the relative displacement between the rotor and the mass body in the rotational direction.

Attachment of the cam follower is herein done with use of the pin coupling the first inertia ring and the second inertia ring. Therefore, each of the plurality of cam mechanisms is simplified in configuration.

(11) A torque converter according to the present disclosure is disposed between an engine and a transmission. The torque converter includes an input-side rotor, to which a torque is inputted from the engine, an output-side rotor outputting the torque to the transmission, a damper disposed between the input-side rotor and the output-side rotor, and the torque fluctuation inhibiting device configured as any of the above.

(12) A power transmission device according to the present disclosure includes a flywheel, a clutch device and the torque fluctuation inhibiting device configured as any of the above. The flywheel includes a first inertia body rotated about a rotational axis, a second inertia body, which is rotated about the rotational axis and is rotatable relatively to the first inertia body, and a damper disposed between the first inertia body and the second inertia body. The clutch device is provided on the second inertia body of the flywheel.

Overall, according to the present disclosure described above, it is possible to inhibit deterioration in performance to attenuate torque fluctuations and stabilize the performance to attenuate torque fluctuations in the torque fluctuation inhibiting device including centrifugal elements and cam mechanisms.

BRIEF DESCRIPTION OF THE DRAWINGS

Referring now to the attached drawings which form a part of this original disclosure.

DETAILED DESCRIPTION OF EMBODIMENTS

First Preferred Embodiment

Figure 1:
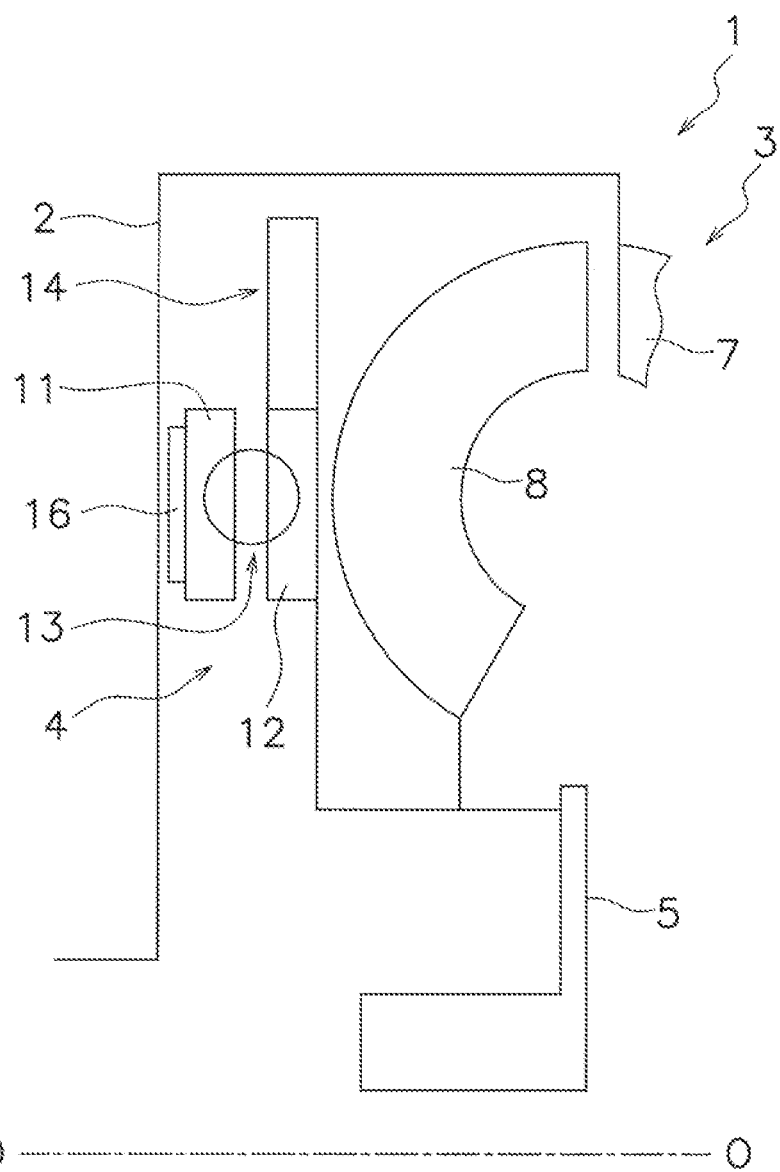
FIG. 1 is a schematic diagram of a torque converter according to a first preferred embodiment of the present disclosure.

FIG. 1 is a schematic diagram in a condition that a torque fluctuation inhibiting device according to a first preferred embodiment of the present disclosure is attached to a lock-up device of a torque converter. In FIG. 1, line O-O indicates a rotational axis of the torque converter.

[Entire Configuration]

A torque converter 1 includes a front cover 2, a torque converter body 3, a lock-up device 4 and an output hub 5. A torque is inputted to the front cover 2 from an engine. The torque converter body 3 includes an impeller 7 coupled to the front cover 2, a turbine 8 and a stator (not shown in the drawings). The turbine 8 is coupled to the output hub 5, and an input shaft of a transmission (not shown in the drawings) is capable of being spline-coupled to the inner peripheral part of the output hub 5.

[Lock-Up Device 4]

The lock-up device 4 includes a clutch part, a piston to be actuated by hydraulic pressure, and so forth, and is settable to a lock-up on state and a lock-up off state. In the lock-up on state, the torque inputted to the front cover 2 is transmitted to the output hub 5 through the lock-up device 4 without through the torque converter body 3. On the other hand, in the lock-up off state, the torque inputted to the front cover 2 is transmitted to the output hub 5 through the torque converter body 3.

The lock-up device 4 includes an input-side rotor 11, a hub flange 12 (rotor), a damper 13 and a torque fluctuation inhibiting device 14.

The input-side rotor 11 includes an axially movable piston, and is provided with a friction member 16 fixed to the front cover 2-side lateral surface thereof. When the friction member 16 is pressed onto the front cover 2, the torque is transmitted from the front cover 2 to the input-side rotor 11.

The hub flange 12 is disposed in axial opposition to the input-side rotor 11, and is rotatable relatively to the input-side rotor 11. The hub flange 12 is coupled to the output hub 5.

The damper 13 is disposed between the input-side rotor 11 and the hub flange 12. The damper 13 includes a plurality of torsion springs, and elastically couples the input-side rotor 11 and the hub flange 12 in a rotational direction. The damper 13 transmits the torque from the input-side rotor 11 to the hub flange 12, and also, absorbs and attenuates torque fluctuations.

[Torque Fluctuation Inhibiting Device 14]

Figure 2:
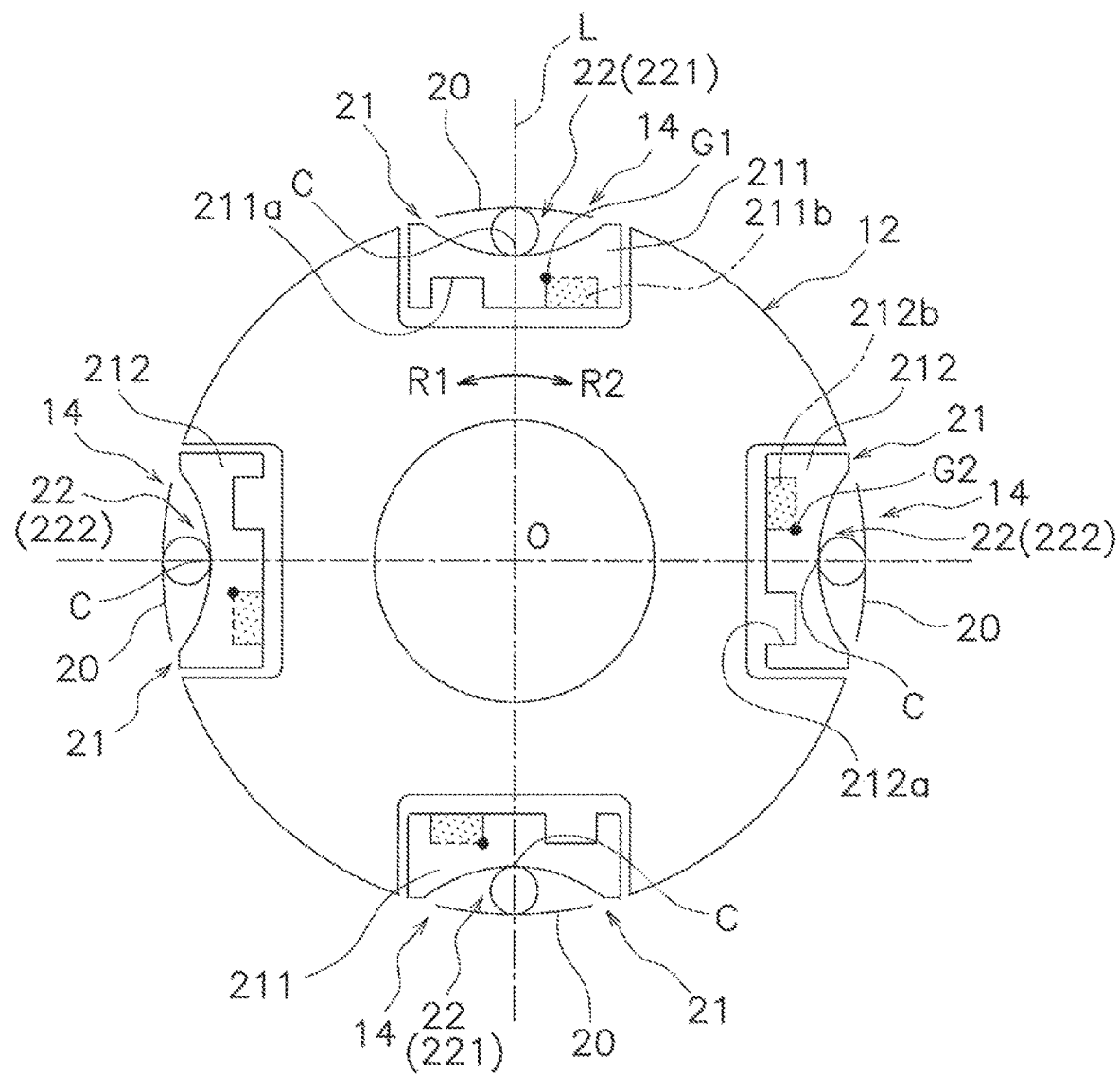
FIG. 2 is a schematic front view of a hub flange and cam mechanisms in FIG. 1.
Figure 3:
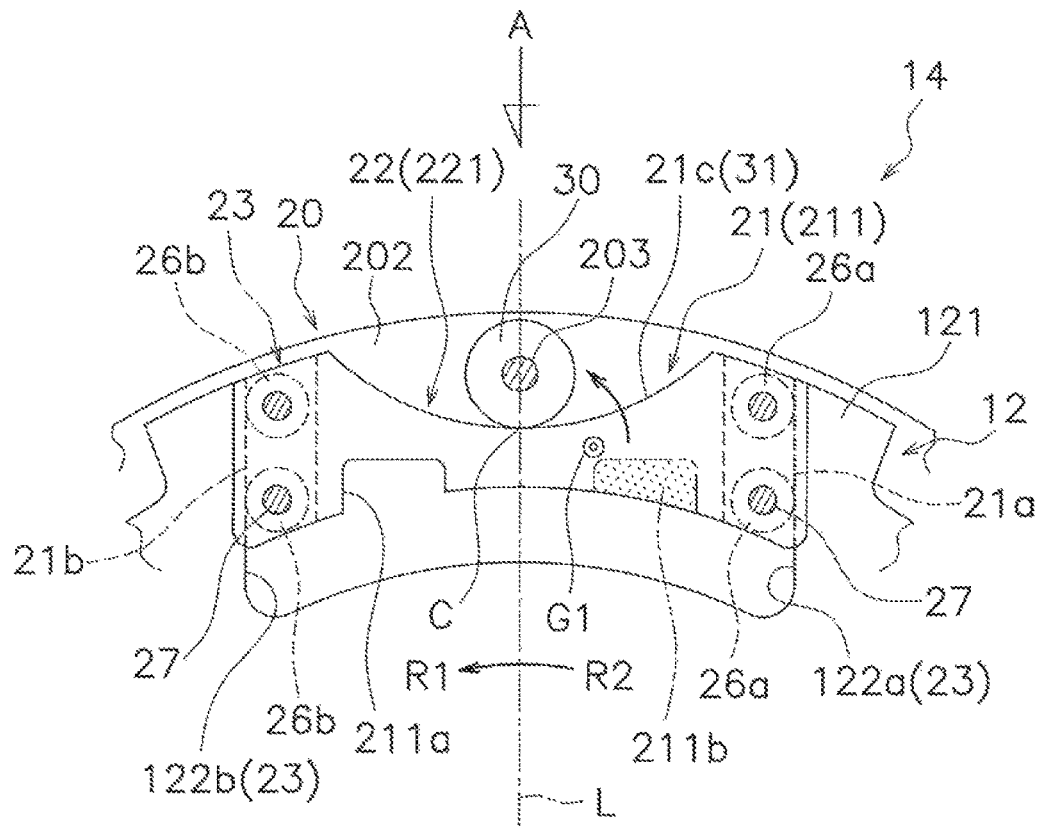
FIG. 3 is a partial front view of the hub flange and a torque fluctuation inhibiting device in FIG. 1.
Figure 4:
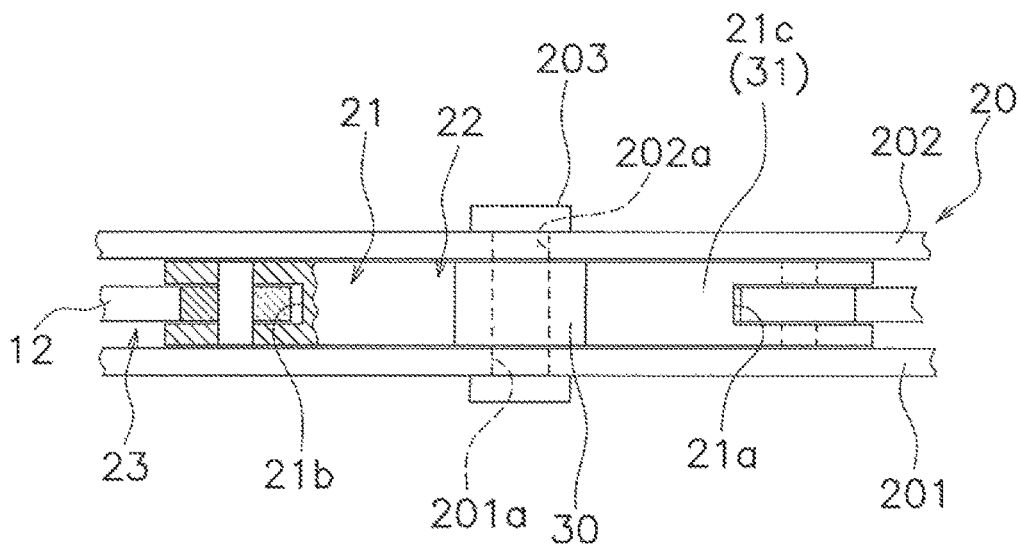
FIG. 4 is a view of FIG. 3 as seen from arrow A.
Figure 5:
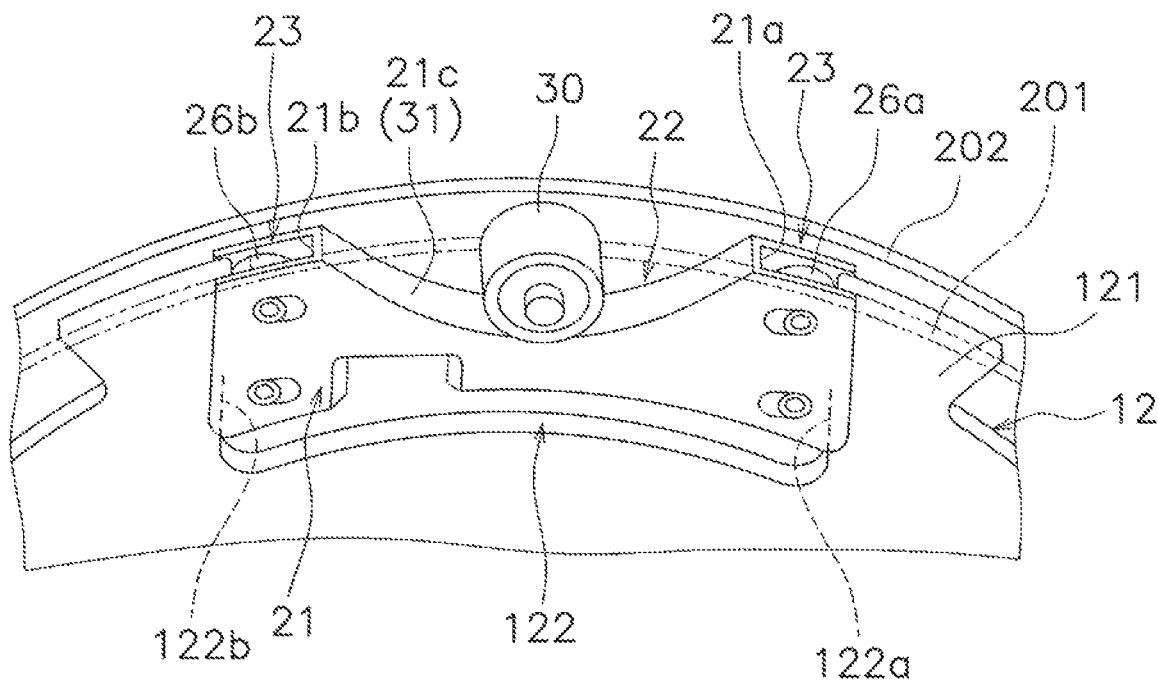
FIG. 5 is a perspective view of the appearance of the part shown in FIG. 3.

FIGS. 2 to 5 show the torque fluctuation inhibiting device 14. FIG. 2 is a schematic front view of the hub flange 12 and the torque fluctuation inhibiting device 14. FIG. 3 is a detailed view of part of FIG. 2. FIG. 4 is a view of FIG. 3 as seen from a direction A. FIG. 5 is a perspective view of the appearance of the part shown in FIG. 3. It should be noted that FIGS. 2 and 3 show a condition that one of inertia rings (near-side inertia ring) is detached.

The torque fluctuation inhibiting device 14 includes first and second inertia rings 201 and 202, which compose an inertia ring 20 as a mass body, four centrifugal elements 21, four cam mechanisms 22 and a plurality of support portions 23.

<First and Second Inertia Rings 201 and 202>

Each of the first and second inertia rings 201 and 202 is a continuous annular plate having a predetermined thickness. As shown in FIG. 4, the first and second inertia rings 201 and 202 are disposed axially on both sides of the hub flange 12 such that a predetermined gap is produced between the hub flange 12 and each inertia ring 201, 202. In other words, the hub flange 12 and the first and second inertia rings 201 and 202 are disposed in axial alignment. The first and second inertia rings 201 and 202 have a common rotational axis that is the same as the rotational axis of the hub flange 12. The first and second inertia rings 201 and 202 are rotatable with the hub flange 12, and are also rotatable relatively to the hub flange 12.

Each of the first and second inertia rings 201 and 202 includes holes 201a, 202a, each of which axially penetrates therethrough. Additionally, the first and second inertia rings 201 and 202 are fixed by rivets 203 that penetrate the holes 201a and 202a thereof. Therefore, the first inertia ring 201 is axially, radially and rotation-directionally immovable with respect to the second inertia ring 202.

<Hub Flange 12>

The hub flange 12 has a disc shape, and as described above, is coupled at the inner peripheral part thereof to the output hub 5. The hub flange 12 is provided with four protruding portions 121 on the outer peripheral part thereof. Each protruding portion 121 protrudes therefrom to the further outer peripheral side, and has a predetermined width in the circumferential direction. Each protruding portion 121 is provided with a recessed portion 122 having a predetermined width in the circumferentially middle part thereof. The recessed portion 122 is opened radially outward and has a predetermined depth.

<Centrifugal Elements 21 and Support Portions 23>

The centrifugal elements 21 are composed of two first centrifugal elements 211 and two second centrifugal elements 212. In the following explanation, the four centrifugal elements 211 and 212 will be simply referred to as "the centrifugal elements 21" in a collective manner on an as-needed basis. The two first centrifugal elements 211 are disposed in opposed positions, and put differently, are disposed away from each other at angular intervals of 180 degrees. Likewise, the two second centrifugal elements 212 are disposed away from each other at angular intervals of 180 degrees. Each adjacent pair of first and second centrifugal elements 211 and 212 is disposed at an angular interval of 90 degrees.

The centrifugal elements 21 are disposed in the recessed portions 122 of the hub flange 12, respectively, and are radially movable by centrifugal forces generated in rotation of the hub flange 12. Each centrifugal element 21 has a circumferentially extending shape and includes grooves 21a and 21b on both circumferential ends thereof. Each groove 21a, 21b has a larger thickness than the hub flange 12, whereby the hub flange 12 is inserted into part of each groove 21a, 21b.

As shown in FIGS. 2 and 3, each first centrifugal element 211 has an asymmetric shape with reference to straight line L connecting a rotational center O of the hub flange 12 and the circumferential center of each cam mechanism 22. Therefore, the center of gravity of each first centrifugal element 211 deviates from the straight line L.

When explained in more detail, the straight line L is a straight line connecting the rotational center O and a contact point C. The contact point C is a contact point between a cam 31 (to be described) and a cam follower 30 (to be described) in a condition that each centrifugal element 21 receives a centrifugal force while the hub flange 12 and the first and second inertia rings 201 and 202 are not rotated relatively to each other.

The configuration of each first centrifugal element 211 will be explained in more detail. Each first centrifugal element 211 is provided with an opening 211a, recessed to the outer peripheral side, on a rotation-directionally R1 side part of the inner peripheral end thereof. In other words, each first centrifugal element 211 is provided with a weight portion 211b (depicted with a plurality of dots in FIGS. 2 and 3), having the same shape as the opening 211a, on a rotation-directionally R2 side part of the inner peripheral end thereof. Due to the weight portion 211b, each first centrifugal element 211 has a center of gravity G1 in a position deviating from the circumferential center thereof to the rotation-directionally R2 side.

On the other hand, contrarily to each first centrifugal element 211, each second centrifugal element 212 is provided with an opening 212a on a rotation-directionally R2 side part of the inner peripheral end thereof. In other words, each second centrifugal element 212 is provided with a weight portion 212b, having the same shape as the opening 212a, on a rotation-directionally R1 side part of the inner peripheral end thereof. Due to the weight portion 212b, contrarily to each first centrifugal element 211, each second centrifugal element 212 has a center of gravity G2 in a position deviating to the rotation-directionally R1 side.

With the aforementioned configuration, when a centrifugal force acts on each first centrifugal element 211, a rotational moment of inertia acts on each first centrifugal element 211 in the counterclockwise direction about an axis arranged in parallel to the rotational axis of the hub flange 12. By contrast, when a centrifugal force acts on each second centrifugal element 212, a rotational moment of inertia acts on each second centrifugal element 212 in the clockwise direction about an axis arranged in parallel to the rotational axis of the hub flange 12.

It should be noted that an outer peripheral surface 21c of each centrifugal element 21 is recessed to the inner peripheral side in a circular-arc shape, and as described below, functions as the cam 31.

Additionally as shown in FIG. 3, each centrifugal element 21 includes a first guide roller 26, a second guide roller 26b, and pins 27 by which the first and second guide rollers 26a and 26b are rotatably supported, respectively.

The first guide roller 26a is disposed in the groove 21a on one end of each centrifugal element 21, whereas the second guide roller 26b is disposed in the groove 21b provided on the other end of each centrifugal element 21. Each of the first and second guide rollers 26a and 26b is composed of an outer peripheral side rolling element and an inner peripheral side rolling element disposed on the inner peripheral side of the outer peripheral side rolling element. The first guide roller 26a is capable of rolling in contact with a first sidewall 122a in each recessed portion 122, whereas the second guide roller 26b is capable of rolling in contact with a second sidewall 122b located on the opposite side of the first sidewall 122a in each recessed portion 122. In other words, the first and second sidewalls 122a and 122b in each recessed portion 122 functions as each support portion 23 by which each centrifugal element 21 is supported in a radially movable state.

The pins 27 are provided to penetrate the grooves 21a and 21b of each centrifugal element 21 in a rotational axis direction. Both ends of each pin 27 are fixed to each centrifugal element 21.

<Cam Mechanisms 22>

Each cam mechanism 22 is composed of the roller 30 having a cylindrical shape as a cam follower and the cam 31 corresponding to the outer peripheral surface 21c of each centrifugal element 21. The roller 30 is fitted onto the outer periphery of the trunk of each rivet 203. In other words, the roller 30 is supported by each rivet 203. It should be noted that the roller 30 is preferably attached to each rivet 203 in a rotatable state, but alternatively, can be attached to each rivet 203 in a non-rotatable state. The cam 31 is a circular-arc surface with which the roller 30 makes contact. The roller 30 is moved along the cam 31 when the hub flange 12 and the first and second inertia rings 201 and 202 are rotated relatively to each other in a predetermined angular range.

The cam 31 (the outer peripheral surface 21c) provided on each first centrifugal element 211 and that provided on each second centrifugal element 212 have the same shape. However, as described above, the center of gravity of each first centrifugal element 211 and that of each second centrifugal element 212 are located in different positions. Therefore, the cam mechanism 22 including the cam 31 provided on each first centrifugal element 211 and that including the cam 31 provided on each second centrifugal element 212 have different torsional characteristics. In the following explanation, when these cam mechanisms 22 are required to be distinguished from each other, the former cam mechanism 22 will be described as a first cam mechanism 221, whereas the latter cam mechanism 22 will be described as a second cam mechanism 221.

Although described below in detail, when rotational phase difference is produced between the hub flange 12 and the first and second inertia rings 201 and 202 by the contact between the roller 30 and the cam 31, a centrifugal force generated in each centrifugal element 21 is converted into a circumferential force by which the rotational phase difference is reduced.

[Actuation of Cam Mechanisms 22]

Actuation of each cam mechanism 22 (inhibition of torque fluctuations) will be explained with FIGS. 3 and 6. It should be noted that in the following explanation, the pair of first and second inertia rings 201 and 202 will be simply referred to as "an inertia ring 20" on an as-needed basis.

In the lock-up on state, a torque transmitted to the front cover 2 is transmitted to the hub flange 12 through the input-side rotor 11 and the damper 13.

When torque fluctuations do not exist in torque transmission, the hub flange 12 and the inertia ring 20 are rotated in the condition shown in FIG. 3. In this condition, the roller 30 in each cam mechanism 22 is contacted to the most inner peripheral position (circumferential middle position) of the cam 31, and the rotational phase difference between the hub flange 12 and the inertia ring 20 is "0".

As described above, the rotation-directional relative displacement between the hub flange 12 and the inertia ring 20 is referred to as "rotational phase difference". In FIGS. 3 and 6, these terms indicate displacement between the circumferential middle position of each centrifugal element 21 and each cam 31 and the center position of each roller 30.

Figure 6:
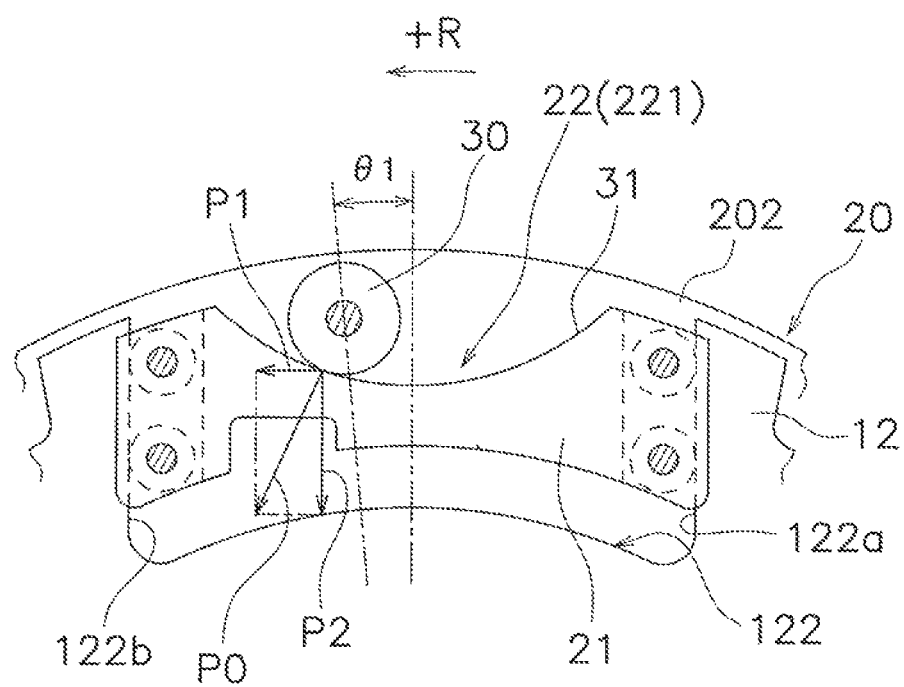
FIG. 6 is a diagram for explaining actuation of each cam mechanism.

When torque fluctuations herein exist in torque transmission, rotational phase difference θ is produced between the hub flange 12 and the inertia ring 20 as shown in FIG. 6. FIG. 6 shows a condition that rotational phase difference +θ1 (e.g., 5 degrees) is produced to a +R side.

As shown in FIG. 6, when the rotational phase difference +θ is produced between the hub flange 12 and the inertia ring 20, the roller 30 in each cam mechanism 22 is relatively moved along the cam 31 to the left side in FIG. 6. At this time, a centrifugal force acts on each centrifugal element 21. Hence, a reaction force to be received by the cam 31 provided on each centrifugal element 21 from the roller 30 has a direction and a magnitude indicated by P0 in FIG. 6. A first force component P1 and a second force component P2 are produced by the reaction force P0. The first force component P1 is directed in the circumferential direction, whereas the second force component P2 is directed to move each centrifugal element 21 to the inner peripheral side.

Additionally, the first force component P1 acts as a force to move the hub flange 12 leftward in FIG. 6 through each cam mechanism 22 and each centrifugal element 21. In other words, a force directed to reduce the rotational phase difference between the hub flange 12 and the inertia ring 20 is supposed to act on the hub flange 12. On the other hand, the second force component P2 moves each centrifugal element 21 to the inner peripheral side against the centrifugal force.

It should be noted that when the rotational phase difference is reversely produced, the roller 30 is relatively moved along the cam 31 to the right side in FIG. 6. However, the aforementioned actuation principle is also true of this case.

As described above, when the rotational phase difference is produced between the hub flange 12 and the inertia ring 20 by torque fluctuations, the hub flange 12 receives a force (first force component P1) directed to reduce the rotational phase difference between both by the centrifugal force acting on each centrifugal element 21 and the working of each cam mechanism 22. Torque fluctuations are inhibited by this force.

The aforementioned force inhibiting torque fluctuations varies in accordance with the centrifugal force, in other words, the rotational speed of the hub flange 12, and also varies in accordance with the rotational phase difference and the shape of each cam 31. Therefore, by suitably setting the shape of each cam 31, characteristics of the torque fluctuation inhibiting device 14 can be made optimal in accordance with the specification of the engine and so forth.

For example, each cam 31 can be made in a shape that makes the first force component P1 linearly vary in accordance with the rotational phase difference in a condition where the centrifugal force acting is constant. Alternatively, each cam 31 can be made in a shape that makes the first force component P1 non-linearly vary in accordance with the rotational phase difference.

To smoothly move each centrifugal element 21, slight gaps are herein reliably produced between each centrifugal element 21 and the sidewalls 122a and 122b of each recessed portion 122.

On the other hand, when a centrifugal force acts on each centrifugal element 21, a rotational moment of inertia acting on each first centrifugal element 211 and that acting on each second centrifugal element 212 are oriented in opposite directions. Specifically, as shown in FIGS. 2 and 3, the center of gravity G1 of each first centrifugal element 211 deviates to the rotation-directionally R2 side with reference to the straight line L. Therefore, when a centrifugal force acts on each first centrifugal element 211, as shown in FIG. 3, a rotational moment of inertia acts on each first centrifugal element 211 in the counterclockwise direction about an axis including the contact point C between each cam 31 and each cam follower 30 (the axis arranged in parallel to the rotational axis of the hub flange 12). When the rotational moment of inertia acts on each first centrifugal element 211, each first centrifugal element 211 changes in posture, and the inner peripheral side rolling element of the first guide roller 26a makes contact with the first sidewall 122a of the corresponding recessed portion 122 whereas the outer peripheral side rolling element of the second guide roller 26b makes contact with the second sidewall 122b of the corresponding recessed portion 122.

As described above, when the rotational moment of inertia acts on each first centrifugal element 211, the gaps between each first centrifugal element 211 and the first and second sidewalls 122a and 122b of the corresponding recessed portion 122 become "0". Then, this condition is maintained until the rotational phase difference between the hub flange 12 and the inertia ring 20 exceeds a predetermined phase difference (this will be described below in detail). In other words, each first centrifugal element 211 is stabled in posture.

On the other hand, the center of gravity G2 of each second centrifugal element 212 deviates to the opposite rotation-directional side. Hence, when a centrifugal force acts on each second centrifugal element 212, a rotational moment of inertia acts on each second centrifugal element 212 in the opposite direction to the rotational moment of inertia acting on each first centrifugal element 211. Because of this, the gaps between each second centrifugal element 212 and the first and second sidewalls 122a and 122b of the corresponding recessed portion 122 also become "0". Therefore, similarly to the above, each second centrifugal element 212 is stabled in posture.

[Torsional Characteristics of Torque Fluctuation Inhibiting Device]

Figure 7:
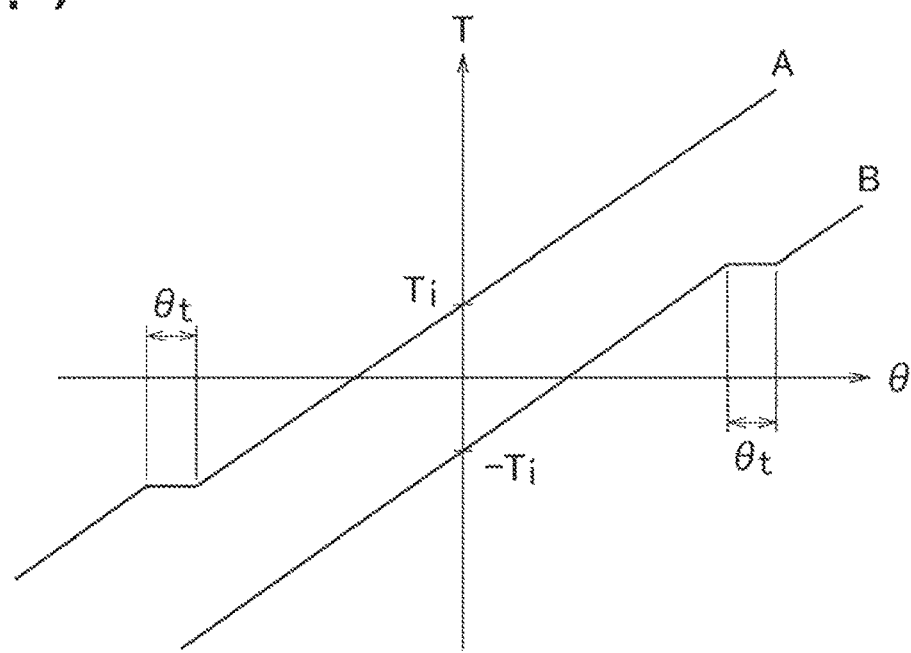
FIG. 7 is a diagram showing a torsional characteristic of first cam mechanisms and that of second cam mechanisms.
Figure 8:
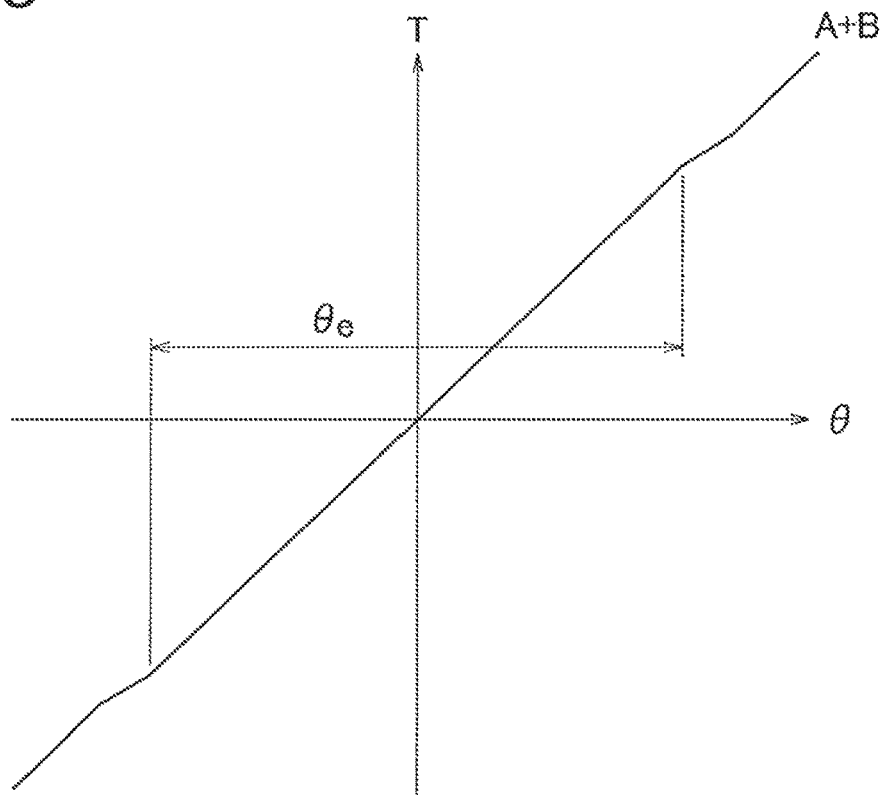
FIG. 8 is a diagram showing a resultant torsional characteristic of the first and second cam mechanisms.

FIGS. 7 and 8 show torsional characteristics of the torque fluctuation inhibiting device configured as described above. In FIG. 7, a characteristic A is a torsional characteristic of the first cam mechanisms 221, whereas a characteristic B is a torsional characteristic of the second cam mechanisms 222. In FIGS. 7 and 8, the horizontal axis indicates the rotational phase difference between the hub flange 12 and the inertia ring 20 (a torsion angle $\theta$ between both). On the other hand, the vertical axis indicates a torque T (corresponding to the circumferential force component P1 in FIG. 6) produced to inhibit torque fluctuations by the first cam mechanisms 221 and/or the second cam mechanisms 222.

As described above, gaps are produced between each of the first and second centrifugal elements 211 and 212 and the corresponding recessed portion 122, and the center of gravity of each of the first and second centrifugal elements 211 and 212 deviates to one of the rotation-directional sides. Therefore, even when the rotational phase difference is not produced between the hub flange 12 and the inertia ring 20, a rotational moment of inertia acts on each of the first and second centrifugal elements 211 and 212, and this results in tilt in posture of each of the first and second centrifugal elements 211 and 212. Put differently, this results in tilt of the profile of the cam 31 provided on the outer peripheral surface of each of the first and second centrifugal elements 211 and 212. Hence, even when the torsion angle $\theta$ is "0", an initial torque Ti is generated. An initial torque +Ti in the torsional characteristic A exerted by the first cam mechanisms 221 and an initial torque -Ti in the torsional characteristic B exerted by the second cam mechanisms 222 are oriented in opposite directions, because the center of gravity of each first centrifugal element 211 and that of each second centrifugal element 212 deviate in opposite directions.

Additionally, when the torsion angle $\theta$ increases, the torque T for inhibiting torque fluctuations also increases in accordance therewith. When the contact point C between each cam 31 and each cam follower 30 then passes through the center of gravity G, each of the first and second centrifugal elements 211 and 212 is tilted in the opposite direction. At this time, the torque does not fluctuate in a torsion angular range in which the rotational phase difference is produced (torsion angular ranges $\theta t$ in FIG. 7). In the torsional characteristic A of the cam mechanisms 221, the torsion angular range $\theta t$ without torque fluctuations indicates a predetermined torsion angular range in which rotational displacement is produced to a negative side. By contrast, in the torsional characteristic B of the second cam mechanisms 222, the torsion angular range $\theta t$ without torque fluctuations indicates a predetermined torsion angular range in which rotational displacement is produced to a positive side.

FIG. 7 separately show the torsional characteristic A of the first cam mechanisms 221 and the torsional characteristic B of the second cam mechanisms 222. However, in the device of the present preferred embodiment, the first cam mechanisms 221 and the second cam mechanisms 222 are equal in number. In addition, the first cam mechanisms 221 are symmetrically disposed with respect to the rotational axis, while the second cam mechanisms 222 are symmetrically disposed with respect to the rotational axis. Therefore, as shown in FIG. 8, a torsional characteristic A+B of the entire device is a resultant characteristic obtained by combining the torsional characteristics A and B in FIG. 7. In the torsional characteristic shown in FIG. 8, the initial torque becomes "0", because the initial torque attributed to deviation of the center of gravity of each first centrifugal element 211 and that of each second centrifugal element 212 are canceled out.

It should be noted that torsion angular ranges without torque fluctuations also exist on the positive side and the negative side in the resultant torsional characteristic A+B. However, the first and second cam mechanisms 221 and 222 are actuated within a torsion angular range (θe in FIG. 8) until the torsion angle reaches the torsion angular ranges without torque fluctuations, whereby troubles are not caused in particular.

As described above, with appropriate setting of the actuation range of the first and second cam mechanisms 221 and 222, the centrifugal elements 21 are stabled in posture while being actuated. Therefore, a hysteresis torque can be eliminated in the torsional characteristic of the torque fluctuation inhibiting device 14.

Additionally, because of the same reason that the centrifugal elements 21 are stabled in posture while being actuated, the profile of the cam 31 is not changed. Therefore, a desired characteristic can be stably obtained.

[Exemplary Characteristics]

Figure 9:
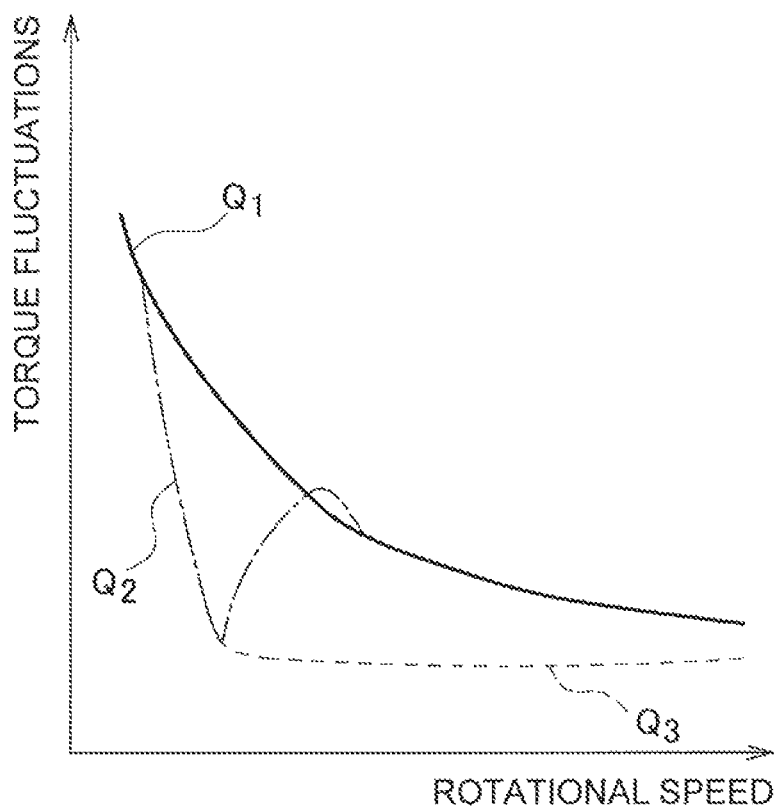
FIG. 9 is a characteristic diagram showing a relation between rotational speed and torque fluctuations.

FIG. 9 is a diagram showing exemplary torque fluctuation inhibiting characteristics. The horizontal axis indicates rotational speed, whereas the vertical axis indicates torque fluctuations (rotation velocity fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 14 of the present preferred embodiment.

As is obvious from FIG. 9, in an apparatus in which the well-known dynamic damper device without any cam mechanism is installed (characteristic Q2), torque fluctuations can be inhibited only in a specific rotational speed range. By contrast, in the condition with installation of the cam mechanisms 22 of the present preferred embodiment (characteristic Q3), torque fluctuations can be inhibited through the entire rotational speed ranges.

Second Preferred Embodiment

Figure 10:
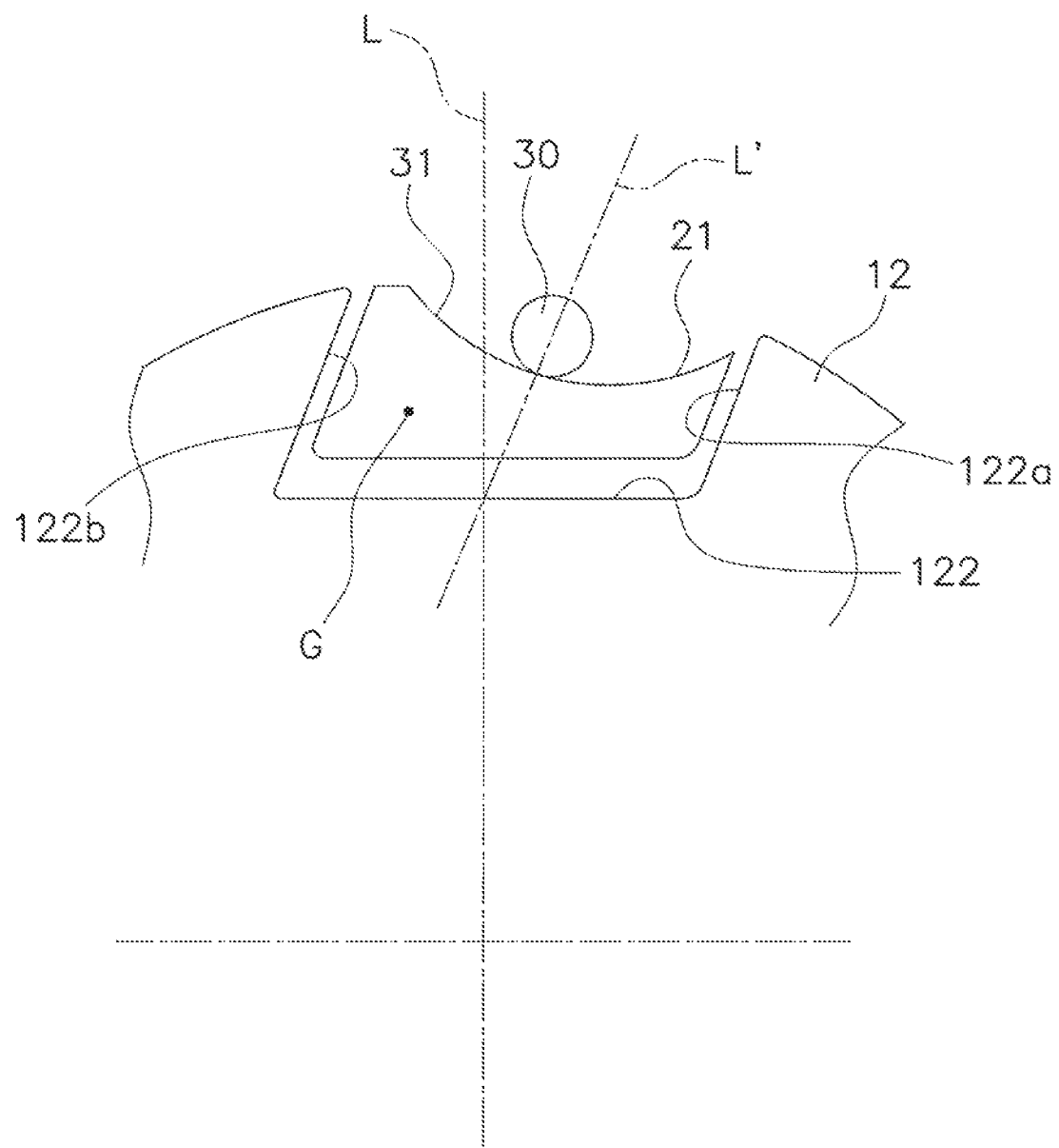
FIG. 10 is a diagram corresponding to FIG. 2 in a second preferred embodiment of the present disclosure.

FIG. 10 shows a second preferred embodiment. FIG. 10 corresponds to FIG. 3 in the first preferred embodiment. The second preferred embodiment is different from the first preferred embodiment regarding each centrifugal element and the moving direction thereof, but is similar to the first preferred embodiment regarding the configurations of the other constituent elements. It should be noted that in FIG. 10, when a given member is the same as or equivalent to a comparative member in the first preferred embodiment, a reference sign assigned to the comparative member will be similarly assigned to the given member.

In the second preferred embodiment, each centrifugal element 21 is moved along the extending direction of straight line L' slanting with respect to the straight line L that connects the rotational center of the hub flange 12 and the contact point C between each cam 31 and each cam follower 30 in a neutral condition (a condition without rotational phase difference between the hub flange 12 and the inertia ring 20).

Specifically, the first and second sidewalls 122a and 122b in each recessed portion 122 of the hub flange 12 extend in parallel to the straight line L'. Likewise, both circumferential end surfaces of each centrifugal element 21 are also shaped in parallel to the straight line L'. Moreover, similarly in the second preferred embodiment, the center of gravity G of each centrifugal element 21 is located in a position displaced from the straight line L to one rotation-directional side. Because of this, similarly to the first preferred embodiment, when each centrifugal element 21 receives a centrifugal force, the rotational moment of inertia is configured to act on each centrifugal element 21.

Therefore, likewise in the second preferred embodiment shown in FIG. 10, it is possible to achieve advantageous effects similar to those achieved in the first preferred embodiment.

Other Preferred Embodiments

The present advancement is not limited to the preferred embodiments described above, and a variety of changes or modifications can be made without departing from the scope of the present advancement.

(a) The configuration of the weight portion provided in each centrifugal element is not limited to that in each of the aforementioned preferred embodiments. For example, each centrifugal element can be provided with a portion with a larger thickness than the other portion, as the weight portion, on a rotation-directionally one-side part thereof. Alternatively, each centrifugal element can be provided with, as the weight portion, a member made of material with a larger specific gravity than the material of the other portion, and this member can be implanted into and fixed to a rotation-directionally one-side part of each centrifugal element.

(b) The aforementioned preferred embodiments have exemplified the configuration of each guide roller composed of the outer peripheral side rolling element and the inner peripheral side rolling element. However, each guide roller can be composed of only one rolling element. Alternatively, two rolling elements can be provided on both circumferential sides of each centrifugal element on a one-to-one basis, while one rolling element can be provided between the inner peripheral surface of each centrifugal element and the bottom surface in each recessed portion. Thus, totally three rolling elements can compose each guide roller.

(c) In the aforementioned preferred embodiments, the guide rollers are disposed as the support portions. However, other members for reducing friction, such as resin races, seats or so forth can be disposed instead. In this case, the members for reducing friction are configured to be pressed onto either each centrifugal element or each recessed portion of the hub flange by urging members. Alternatively, so-called roller bearings can be used as the guide rollers. In this case, friction can be further reduced between the outer periphery of each roller bearing and either each centrifugal element or each recessed portion of the hub flange.

(d) In the aforementioned preferred embodiments, the first centrifugal elements and the second centrifugal elements are provided as the centrifugal elements. Alternatively, either a plurality of first centrifugal elements or a plurality of second centrifugal elements can be provided.

(e) In the aforementioned preferred embodiments, the centrifugal elements are disposed in the hub flange, but alternatively, can be disposed in the inertia ring.

APPLICATION EXAMPLES

The torque fluctuation inhibiting device described above can be disposed in a variety of settings when applied to a torque converter or other types of power transmission device. Specific application examples will be hereinafter explained with use of schematic diagrams of the torque converter and the other types of power transmission device.

Figure 11:
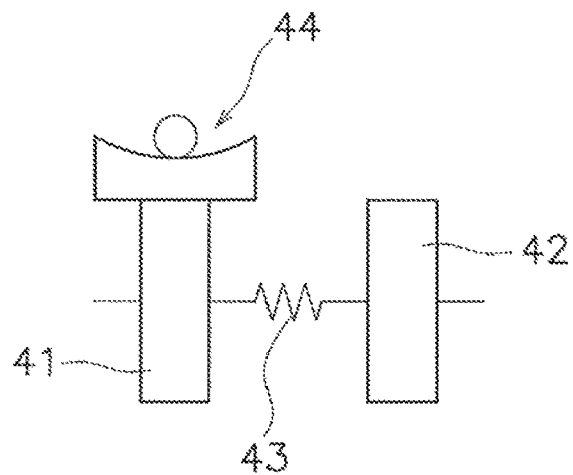
FIG. 11 is a schematic diagram showing application example 1 of the present disclosure.

(1) FIG. 11 is a diagram schematically showing a torque converter. The torque converter includes an input-side rotor 41, a hub flange 42 and a damper 43 disposed between both members 41 and 42. The input-side rotor 41 includes members such as a front cover, a drive plate and a piston. The hub flange 42 includes a driven plate and a turbine hub. The damper 43 includes a plurality of torsion springs.

In the example shown in FIG. 11, a centrifugal element is provided on any of rotary members composing the input-side rotor 41, and a cam mechanism and a support portion are collectively provided as a cam-mechanism and support-portion unit 44 actuated with use of a centrifugal force acting on the centrifugal element. A configuration applicable to the cam-mechanism and support-portion unit 44 is similar to that in the aforementioned respective preferred embodiments.

Figure 12:
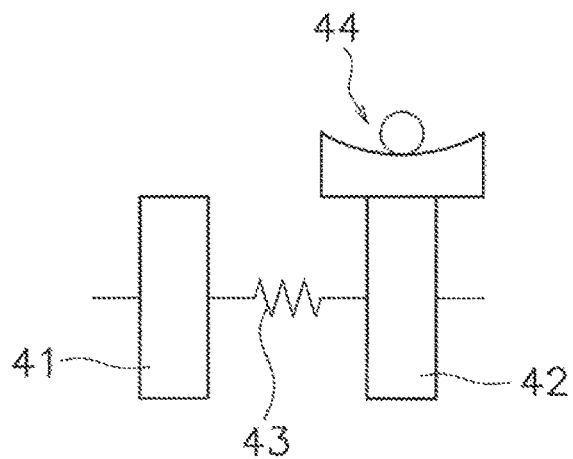
FIG. 12 is a schematic diagram showing application example 2 of the present disclosure.

(2) In a torque converter shown in FIG. 12, a centrifugal element is provided on any of the rotary members composing the hub flange 42, and the cam-mechanism and support-portion unit 44 is provided to be actuated with use of a centrifugal force acting on the centrifugal element. A configuration applicable to the cam-mechanism and support-portion unit 44 is similar to that in the aforementioned respective preferred embodiments.

Figure 13:
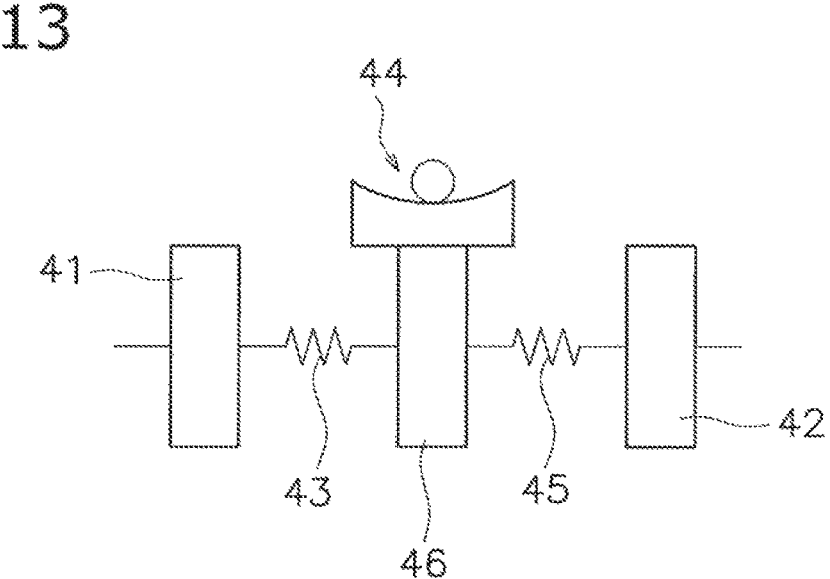
FIG. 13 is a schematic diagram showing application example 3 of the present disclosure.

(3) A torque converter shown in FIG. 13 includes another damper 45 and an intermediate member 46 provided between the two dampers 43 and 45 in addition to the configurations shown in FIGS. 11 and 12. The intermediate member 46 is rotatable relatively to the input-side rotor 41 and the hub flange 42, and makes the two dampers 43 and 45 act in series.

In the example shown in FIG. 13, a centrifugal element is provided on the intermediate member 46, and the cam-mechanism and support-portion unit 44 is provided to be actuated with use of a centrifugal force acting on the centrifugal element. A configuration applicable to the cam-mechanism and support-portion unit 44 is similar to that in the aforementioned respective preferred embodiments.

Figure 14:
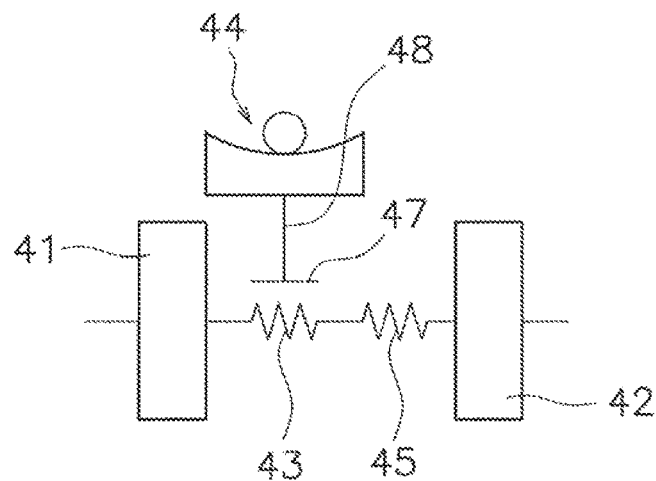
FIG. 14 is a schematic diagram showing application example 4 of the present disclosure.

(4) A torque converter shown in FIG. 14 includes a float member 47. The float member 47 is a member for supporting the torsion springs composing the damper 43. For example, the float member 77 has an annular shape and is disposed to cover the torsion springs from the outer peripheral side and at least one lateral side. Additionally, the float member 47 is rotatable relatively to the input-side rotor 41 and the hub flange 42, and is rotated together with the damper 43 by friction with the torsion springs of the damper 43. In other words, the float member 47 is also rotated.

In the example shown in FIG. 14, the float member 47 is provided with a centrifugal element 48, and the cam-mechanism and support-portion unit 44 is provided to be actuated with use of a centrifugal force acting on the centrifugal element 48. A configuration applicable to the cam-mechanism and support-portion unit 44 is similar to that in the aforementioned respective preferred embodiments.

Figure 15:
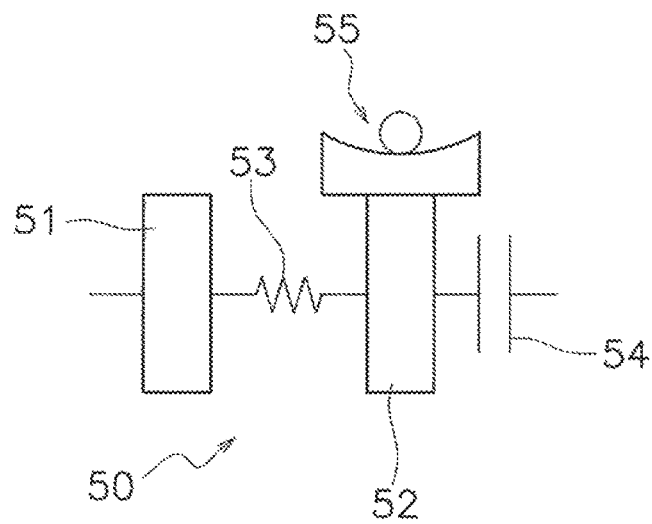
FIG. 15 is a schematic diagram showing application example 5 of the present disclosure.

(5) FIG. 15 is a schematic diagram of a power transmission device that includes a flywheel 50, composed of two inertia bodies 51 and 52, and a clutch device 54. In other words, the flywheel 50, disposed between the engine and the clutch device 54, includes the first inertia body 51, the second inertia body 52 and a damper 53. The second inertia body 52 is disposed to be rotatable relatively to the first inertia body 51. The damper 53 is disposed between the two inertia bodies 51 and 52. It should be noted that the second inertia body 52 is composed of rotary members including a clutch cover composing the clutch device 54.

In the example shown in FIG. 15, any of the rotary members composing the second inertia body 52 is provided with a centrifugal element, and a cam mechanism and a support portion are collectively provided as a cam-mechanism and support-portion unit 55 actuated with use of a centrifugal force acting on the centrifugal element. A configuration applicable to the cam-mechanism and support-portion unit 55 is similar to that in the aforementioned respective preferred embodiments.

Figure 16:
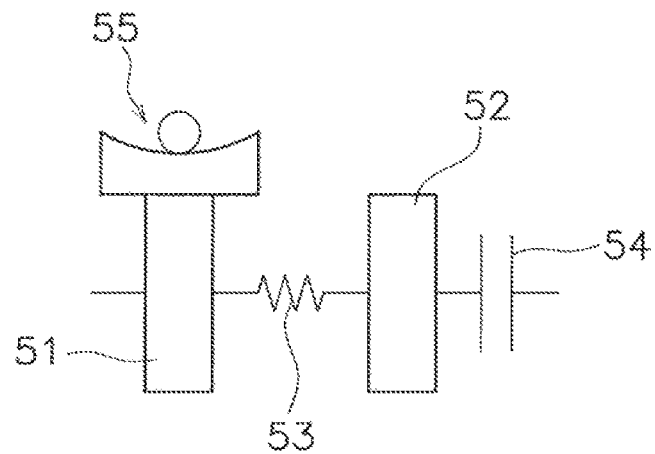
FIG. 16 is a schematic diagram showing application example 6 of the present disclosure.

(6) FIG. 16 shows an example of a power transmission device similar to that in FIG. 15. In this example, the first inertia body 51 is provided with a centrifugal element. Additionally, the cam-mechanism and support-portion unit 55 is provided to be actuated with use of a centrifugal force acting on the centrifugal element. A configuration applicable to the cam-mechanism and support-portion unit 55 is similar to that in the aforementioned respective preferred embodiments.

Figure 17:
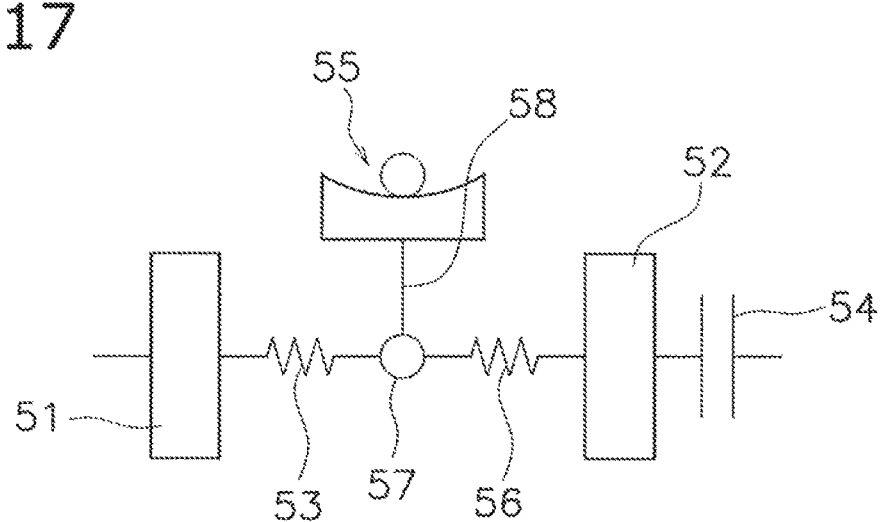
FIG. 17 is a schematic diagram showing application example 7 of the present disclosure.

(7) A power transmission device shown in FIG. 17 includes another damper 56 and an intermediate member 57 provided between two dampers 53 and 56 in addition to the configurations shown in FIGS. 15 and 16. The intermediate member 57 is rotatable relatively to the first inertia body 51 and the second inertia body 52.

In the example shown in FIG. 17, the intermediate member 57 is provided with a centrifugal element 58, and the cam-mechanism and support-portion unit 55 is provided to be actuated with use of a centrifugal force acting on the centrifugal element 58. A configuration applicable to the cam-mechanism and support-portion unit 55 is similar to that in the aforementioned respective preferred embodiments.

Figure 18:
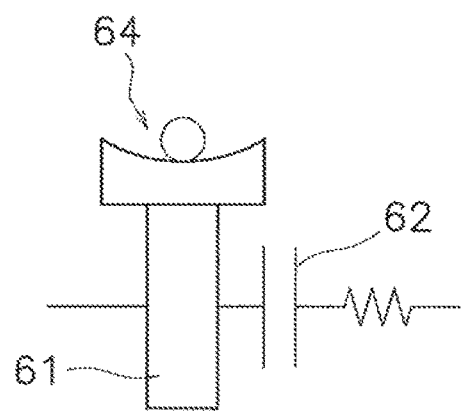
FIG. 18 is a schematic diagram showing application example 8 of the present disclosure.

(8) FIG. 18 is a schematic diagram of a power transmission device that a clutch device is provided on one flywheel. In FIG. 18, a first inertia body 61 includes one flywheel and a clutch cover of a clutch device 62. In this example, a centrifugal element is provided on any of the rotary members composing the first inertia body 61, and a cam mechanism and a support portion are collectively provided as a cam-mechanism and support-portion unit 64 actuated with use of a centrifugal force acting on the centrifugal element. A configuration applicable to the cam-mechanism and support-portion unit 64 is similar to that in the aforementioned respective preferred embodiments.

Figure 19:
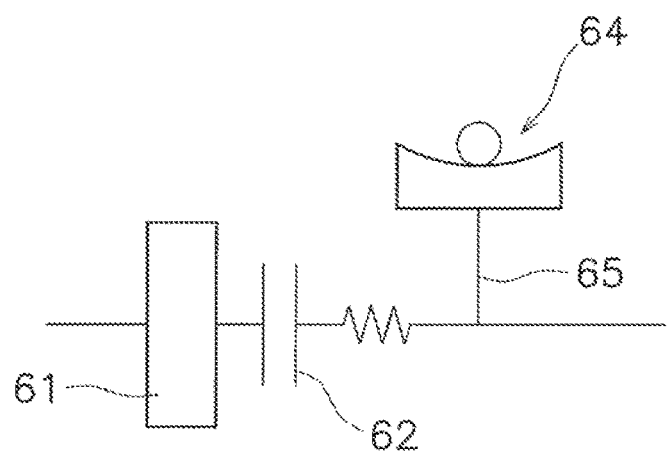
FIG. 19 is a schematic diagram showing application example 9 of the present disclosure.

(9) FIG. 19 shows an example of a power transmission device similar to that in FIG. 18. In this example, a centrifugal element 65 is provided on an output side of the clutch device 62. Additionally, the cam-mechanism and support-portion unit 64 is provided to be actuated with use of a centrifugal force acting on the centrifugal element 65. A configuration applicable to the cam-mechanism and support-portion unit 64 is similar to that in the aforementioned respective preferred embodiments.

(10) The torque fluctuation inhibiting device according to the present disclosure can be disposed on any of the rotary members composing the transmission, and furthermore, can be disposed on an output-side shaft (a propeller shaft or a drive shaft) of the transmission, although these configurations are not shown in the drawings.

(11) As another application example, the torque fluctuation inhibiting device of the present disclosure can be further applied to a heretofore well-known dynamic damper device or a power transmission device provided with a pendulum-type damper device.

What is claimed is:

1. A torque fluctuation inhibiting device, the torque fluctuation inhibiting device comprising:
   a rotor to which a torque is inputted;
   a mass body disposed to be rotatable with the rotor and be rotatable relative to the rotor;
   a plurality of centrifugal elements, each movable in a radial direction when receiving a centrifugal force generated in rotation of the rotor and the mass body, each of the plurality of centrifugal elements for receiving a rotational moment of inertia about an axis arranged in parallel to a rotational axis of the rotor when receiving the centrifugal force;
   a plurality of cam mechanisms, each for converting the centrifugal force into a circumferential force when a relative displacement is produced between the rotor and the mass body in a rotational direction due to the centrifugal force that acts on each of the plurality of centrifugal elements, the circumferential force directed to reduce the relative displacement; and
   a plurality of support portions provided on either the rotor or the mass body, each for making contact with part of each of the plurality of centrifugal elements when each of the plurality of centrifugal elements receives the rotational moment of inertia, each of the plurality of support portions for supporting each of the plurality of centrifugal elements such that each of the plurality of centrifugal elements is movable relative to each of the plurality of support portions in the radial direction along an extending direction of each of the plurality of support portions with a roller interposed between each of the plurality of centrifugal elements and each of the plurality of support portions.

2. The torque fluctuation inhibiting device according to claim 1, wherein
   each of the plurality of cam mechanisms includes
      a cam provided on each of the plurality of centrifugal elements, and
      a cam follower provided on the mass body, the cam follower for being moved along the cam, and
   each of the plurality of centrifugal elements includes a weight portion, each of the plurality of centrifugal elements having a center of gravity that deviates from a straight line connecting a rotational center of the rotor and a point at which the cam and the cam follower make contact with each other while the relative displacement is not produced.

3. The torque fluctuation inhibiting device according to claim 2, wherein each of the plurality of centrifugal elements has an asymmetric shape with reference to a straight line connecting the rotational center of the rotor and a point at which the cam and the cam follower make contact with each other while each of the plurality of centrifugal elements receives the centrifugal force and simultaneously the relative displacement is not produced.

4. The torque fluctuation inhibiting device according to claim 2, wherein each of the plurality of centrifugal elements is moved in a direction slanting with respect to a straight line connecting a rotational center of the rotor and a point at which the cam and the cam follower make contact with each other while the relative displacement is not produced.

5. The torque fluctuation inhibiting device according to claim 2, wherein
   the mass body includes a first inertia ring, a second inertia ring and a pin, the first and second inertia rings disposed in opposition to each other through the rotor, the pin for coupling the first and second inertia rings to each other while the first and second inertia rings are non- rotatable relative to each other,
   each of the plurality of centrifugal elements is disposed on an outer peripheral part of the rotor and on an inner peripheral side of the pin while disposed between the first inertia ring and the second inertia ring in an axial direction,
   the cam follower is a cylindrical roller, the cylindrical roller including a hole in an inner part thereof, the hole penetrated by the pin in the axial direction, and
   the cam is provided on each of the plurality of centrifugal elements so as to make contact with the cam follower, the cam having a shape for making the circumferential force vary in accordance with an amount of the relative displacement between the rotor and the mass body in the rotational direction.

6. The torque fluctuation inhibiting device according to claim 1, wherein the plurality of centrifugal elements include
   a plurality of first centrifugal elements, on each of which the rotational moment of inertia acts in a first direction, and
   a plurality of second centrifugal elements, on each of which the rotational moment of inertia acts in a second direction, the plurality of second centrifugal elements being equal in number to the plurality of first centrifugal elements.

7. The torque fluctuation inhibiting device according to claim 6, wherein the plurality of centrifugal elements include
   the plurality of first centrifugal elements, each of the plurality of first centrifugal elements having a center of gravity that deviates to a first side in the rotational direction, and
   the plurality of second centrifugal elements being equal in number to the plurality of first centrifugal elements, each of the plurality of second centrifugal elements having a center of gravity that deviates to a second side in the rotational direction.

8. The torque fluctuation inhibiting device according to claim 6, wherein the plurality of first centrifugal elements are disposed in pair to be opposed through the rotational center of the rotor while the plurality of second centrifugal elements are disposed in pair to be opposed through the rotational center of the rotor.

9. The torque fluctuation inhibiting device according to claim 1, wherein
   the rotor includes a plurality of recessed portions on an outer peripheral surface thereof, each of the plurality of recessed portions opened radially outward, each of the plurality of recessed portions accommodating each of the plurality of centrifugal elements,
   the roller includes a first guide roller and a second guide roller, the first guide roller rotatably attached to a first circumferentially lateral part of each of the plurality of centrifugal elements, the second guide roller rotatably attached to a second circumferentially lateral part of each of the plurality of centrifugal elements, and each of the plurality of support portions includes first and second sidewalls of each of the plurality of recessed portions, the first sidewall for enabling the first guide roller to make contact therewith, the second sidewall for enabling the second guide roller to make contact therewith.

10. The torque fluctuation inhibiting device according to claim 9, wherein each of the first and second guide rollers includes an outer peripheral side rolling element and an inner peripheral side rolling element, the inner peripheral side rolling element disposed radially inside the outer peripheral side rolling element.

11. A torque converter disposed between an engine and a transmission, the torque converter comprising:

an input-side rotor to which a torque is inputted from the engine;

an output-side rotor for outputting the torque to the transmission;

a damper disposed between the input-side rotor and the output-side rotor; and the torque fluctuation inhibiting device recited in claim 1.

12. A power transmission device comprising:

a flywheel including a first inertia body, a second inertia body and a damper, the first inertia body rotated about a rotational axis, the second inertia body rotated about the rotational axis, the second inertia body rotatable relative to the first inertia body, the damper disposed between the first inertia body and the second inertia body;

a clutch device provided on the second inertia body of the flywheel; and the torque fluctuation inhibiting device recited in claim 1.

* * * * *